United States Patent [19]  [11] 4,413,941
Kollmann  [45] Nov. 8, 1983

[54] MACHINE TOOL SUPPORT TABLE AND FEEDING DEVICE

[75] Inventor: Horst Kollmann, Dornbirn, Austria

[73] Assignee: Firma Schelling & Co., Schwarzach, Austria

[21] Appl. No.: 248,478

[22] Filed: Mar. 27, 1981

[30] Foreign Application Priority Data

Mar. 31, 1980 [AT] Austria ............................. 1715/80

[51] Int. Cl.³ .................................... B65H 31/30
[52] U.S. Cl. .................................... 414/35; 414/43; 414/45; 414/392; 414/417
[58] Field of Search ................. 414/28, 29, 35, 36, 414/43, 45, 391, 392, 416, 417, 677; 198/413, 457, 485, 487, 488

[56] References Cited

U.S. PATENT DOCUMENTS

| 1,695,115 | 12/1928 | Lockhart | 198/488 |
| 2,165,918 | 7/1939 | Black | 414/35 |
| 2,456,004 | 12/1948 | Larkin | 414/35 |
| 2,661,949 | 12/1953 | Bauer | 414/35 X |
| 3,382,966 | 5/1968 | Califano et al. | 414/36 X |
| 3,596,575 | 8/1971 | Brockmuller | 414/43 X |
| 3,746,148 | 7/1973 | Hilger et al. | 198/488 |
| 4,044,886 | 8/1977 | Sender | 414/488 |

FOREIGN PATENT DOCUMENTS

| 699647 | 12/1964 | Canada | 198/487 |
| 1247215 | 8/1967 | Fed. Rep. of Germany | 198/487 |
| 2417083 | 10/1975 | Fed. Rep. of Germany | |
| 2820103 | 11/1978 | Fed. Rep. of Germany | |
| 1263933 | 2/1972 | United Kingdom | |
| 296606 | 4/1971 | U.S.S.R. | 414/391 |

Primary Examiner—Leslie J. Paperner
Attorney, Agent, or Firm—Toren, McGeady and Stanger

[57] ABSTRACT

Apparatus for feeding planar workpieces particularly in a worktable for a cutting saw wherein a reciprocating carriage moves on tracks between a feeding unit and a support table onto which planar workpieces arranged on the carriage may be deposited. When in a position closest to the feeding unit, movement of the carriage toward the support table is blocked by an alignment stop means which may be moved into and out of the path of the carriage. After a stack of planar workpieces has been placed on a grated support surface of the carriage, the carriage is moved to the support table which is composed of a plurality of rollers arranged in adjacent rows, the individual elements of the grated support surface of the carriage means being arranged to be located so that when the carriage means is coplanar with the support table, the workpieces may be transferred to the support table by lowering of the grated support surface.

5 Claims, 4 Drawing Figures

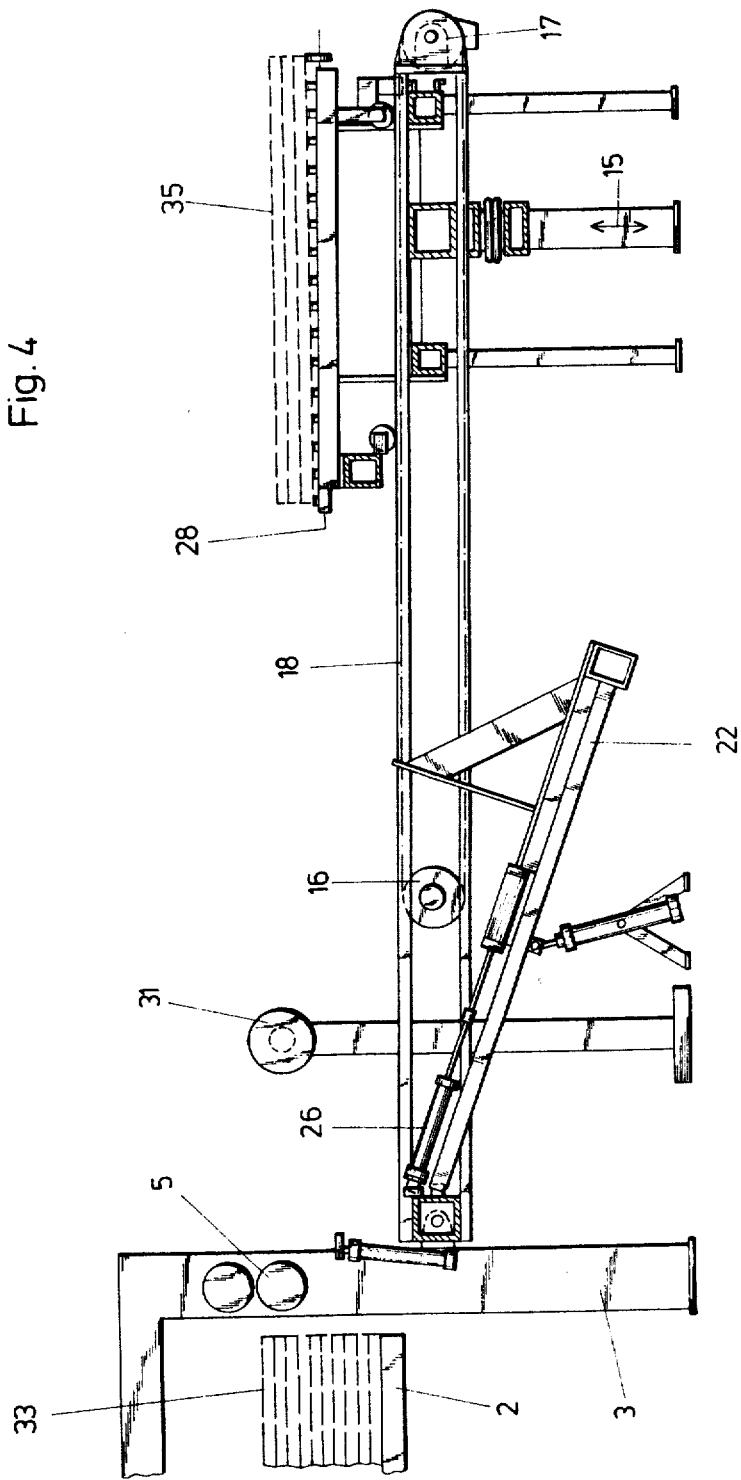

MACHINE TOOL SUPPORT TABLE AND FEEDING DEVICE

The present invention relates generally to equipment for feeding and conveying workpieces in a machine tool mechanism, and more specifically to a device for feeding the support table of a machine tool with planar workpieces. The invention is particularly applicable in connection with machines involving a cutting saw wherein the support table for the planar workpieces may consist of a multiplicity of rollers arranged in rows adjacent each other and wherein a feeding device for the planar workpieces is provided sidewise and at an interval from the support table.

Sawing machines of modern construction, particularly machines for staggered cutting operations, tend to operate at relatively high speeds and with a high number of cutting strokes per unit time. During the cutting procedure, planar workpieces lying horizontally in a stacked arrangement must be pushed into the sawing machine through some sort of slide-in unit or element. The slide-in unit of such a machine and the saw function in a programmed manner so that the workpieces which are cut to size may be obtained in a prescribed size and in a desired number.

In order to obtain true-to-size pieces which require no further edge processing or trimming, the planar workpieces must be aligned with the saw before they are moved through the cutting stroke. Within the cycle of operation, the placement of the planar workpieces into stacks and their alignment tends to occupy a considerable amount of time during which the sawing apparatus may remain idle.

The present invention is directed toward overcoming disadvantages in this type of operation and to provide a device wherein it is possible during the operation of the saw to stack and align the planar workpieces and to deposit the workpieces onto a support table for a short period of time during the conveying procedure, the stack being ready to be moved into the sawing machine immediately upon transfer of the stack onto the support table of the sawing machine.

SUMMARY OF THE INVENTION

Briefly, the present invention may be described as apparatus for feeding planar workpieces in a machine tool assembly particularly upon a worktable for a cutting saw comprising support table means including a plurality of rollers arranged in adjacent rows and defining a support plane for the workpieces, feeding means for feeding the planar workpieces into the apparatus, reciprocating carriage means having a grated support surface operably interposed between the feeding means and the support table for delivering the planar workpieces to the support table when the carriage means is moved in a feeding direction, tracks extending between the feeding means and the support table movably mounting the carriage means thereon, the carriage means being arranged on the tracks to have the grated support surface vertically adjustable in height between a raised position located above the support table plane and a lowered position below the support table plane, and alignment stop means arranged to be moved between the carriage means and the support table when the carriage means is moved against the feeding direction and to be pivoted out of the path of the carriage means when the carriage means is moved in the feeding direction.

Thus, in accordance with the invention, disadvantages of the prior art are overcome in that between the feeding device and the support table there is provided a carriage means or truck in the form of a sliding cart having a grated support surface which is movably mounted onto tracks extending between the feeding device and the support table. The tracks and/or the truck are vertically adjustable in height so that the grated support surface of the truck may be raised to be located somewhat above the support plane of the support table and so that it may be lowered to a level somewhat below the support plane of the support table. When the truck is moved against the feeding direction, there is provided between the truck and the support table a stop or alignment device which may be moved toward the truck and which additionally may pivot sideways out of the path of the truck.

The various features of novelty which characterize the invention are pointed out with particularity in the claims annexed to and forming a part of this disclosure. For a better understanding of the invention, its operating advantages, and specific objects attained by its use, reference should be had to the accompanying drawings and descriptive matter in which there is illustrated and described a preferred embodiment of the invention.

DESCRIPTION OF THE DRAWINGS

In the drawings:

FIGS. 2, 3, and 4 each are side views showing the device of the invention in different operating positions.

DETAILED DESCRIPTION OF THE PREFERRED EMBODIMENT

Figure 1:
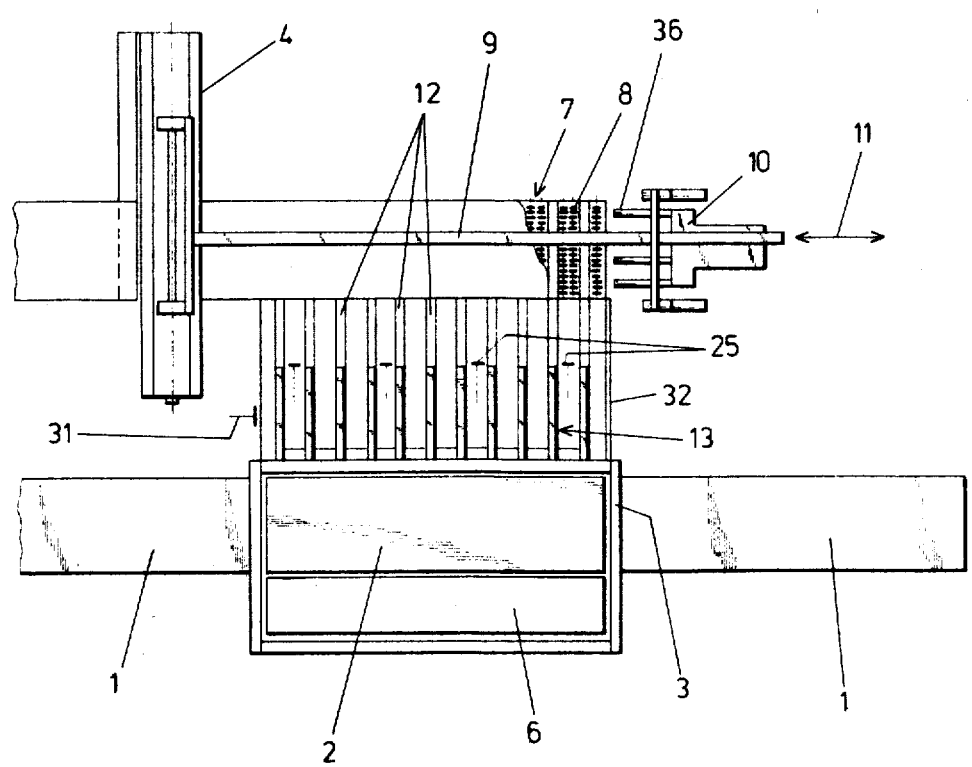
FIG. 1 is a top view schematically illustrating a system in accordance with the invention.

Referring now to the drawings, wherein similar parts are identified with like reference numerals throughout the various figures thereof, there is shown a device for feeding and aligning workpieces in a sawing system operating in a staggered manner wherein the planar workpieces are conveyed between a pair of intake roller conveyors 1 from a lifting table 2 which is vertically adjustable and above which there is provided a portal frame 3.

On the side of the portal frame 3 facing a sawing device or machine 4, that is, facing a support table 7 of the sawing machine 4, there is provided a calender feed roller 5. On the side of the portal frame 3 facing away from this direction there is provided a slide-in device 6 which, during operation, feeds the planar workpieces resting on the lifting table 2 individually to the feed roller 5.

The support table 7 is positioned in front of the sawing mechanism 4. The sawing mechanism 4 is constructed as a below-the-table circular saw and when in operation the saw travels along the machine table during the cutting process and protrudes upwardly from below the plane of the table. When the saw of the sawing unit has reached its end position on the machine table after a cutting stroke, it is lowered below the table and thus is returned to its initial position below the plane of the table.

It will, of course, be apparent that this mode of operation and this type of sawing device are not essential for the present invention.

The support table 7 is connected in series with and positioned in front of the sawing device 4 and consists of a plurality of freely rotatable rollers or rolls 8 arranged on parallel axes, some of which are illustrated in FIG. 1. On a longitudinal track 9 situated above the support table 7, there is mounted for movement in the direction of the arrows 11 a slide-in unit 10 which operates to enable the planar members resting on the support table 7 to be gripped and transported in a programmed manner by clamps 36 of the slide-in unit 10, whereby the planar workpieces may be fed to the sawing device 4 in a step-by-step programmed manner.

Extending sidewise from the support table 7 and the portal frame 3 there are provided tracks 12 upon which a truck or reciprocating carriage means 13 is movable. The structure of the device is seen in somewhat better detail in FIGS. 2-4 wherein, for the sake of clarity, the intake roll conveyors 1 and the sawing device 4 have not be depicted. The tracks 12 are mounted at one end thereof to be pivotable about a horizontal axis relative to the portal frame 3 and on the other end they protrude beneath the support table 7 and are supported by a lifting device 15 at this end.

Guide rollers 16 and a driving motor 17 operable in two turning directions guide and drive an endless drive chain 18 with which the truck or carriage means 13 is connected. The truck or carriage 13 includes a support surface 10 which is formed by girders spaced from each other and lying parallel to the longitudinal extension of the track 12. The height of construction of the truck 13 and the position of the upper limit of the tracks 12 (FIG. 2) are selected in such a manner that the support surface 19 of the truck 13 is slightly higher than the support surface 20 of the support table 7.

A frame 22 is downwardly pivotable around an axis of rotation 21 parallel to the axis 14, this frame being supported by a stationary piston-cylinder lifting device 23. In a guideway 24 of this frame there are provided stops and aligning devices 25 movably mounted in the direction of the arrow 27 by means of piston-cylinder units 26. Some of the girders forming the support surface 19 of the truck 13 may be made in the shape of U-sections so that they open upwardly. Into these U-section girders there can be mounted additional section girders which are connected pivotably by their end facing the stop or aligning device 25 to their supporting profile. On the side of the portal frame 3, these pivotally mounted section girders protrude somewhat in relation to the support plane 19 of the truck 13 and they are connected to each other by means of a transverse girder 28 which is supported at its end by the piston-cylinder lifting device 29 mounted upon the portal frame 3. The pivotably raised girders are indicated by dashed lines 30 in FIG. 2. These girders may be raised by their free ends up to the slide-in plane of the feed roller 5. The girders forming the support surface 19 of the truck 13 are connected with each other on the side facing the portal 3 by a transverse girder 37 and the rightward ends of each of these girders are supported by rollers on the tracks in such a way that the truck 13 in its entirety has a comb shape. Sidewise from the truck 13, when the truck is positioned near the portal frame 3, there is provided on one side thereof a horizontally adjustable aligning device 31 and on the side opposite this aligning device there is provided a stop 32.

Figure 2:
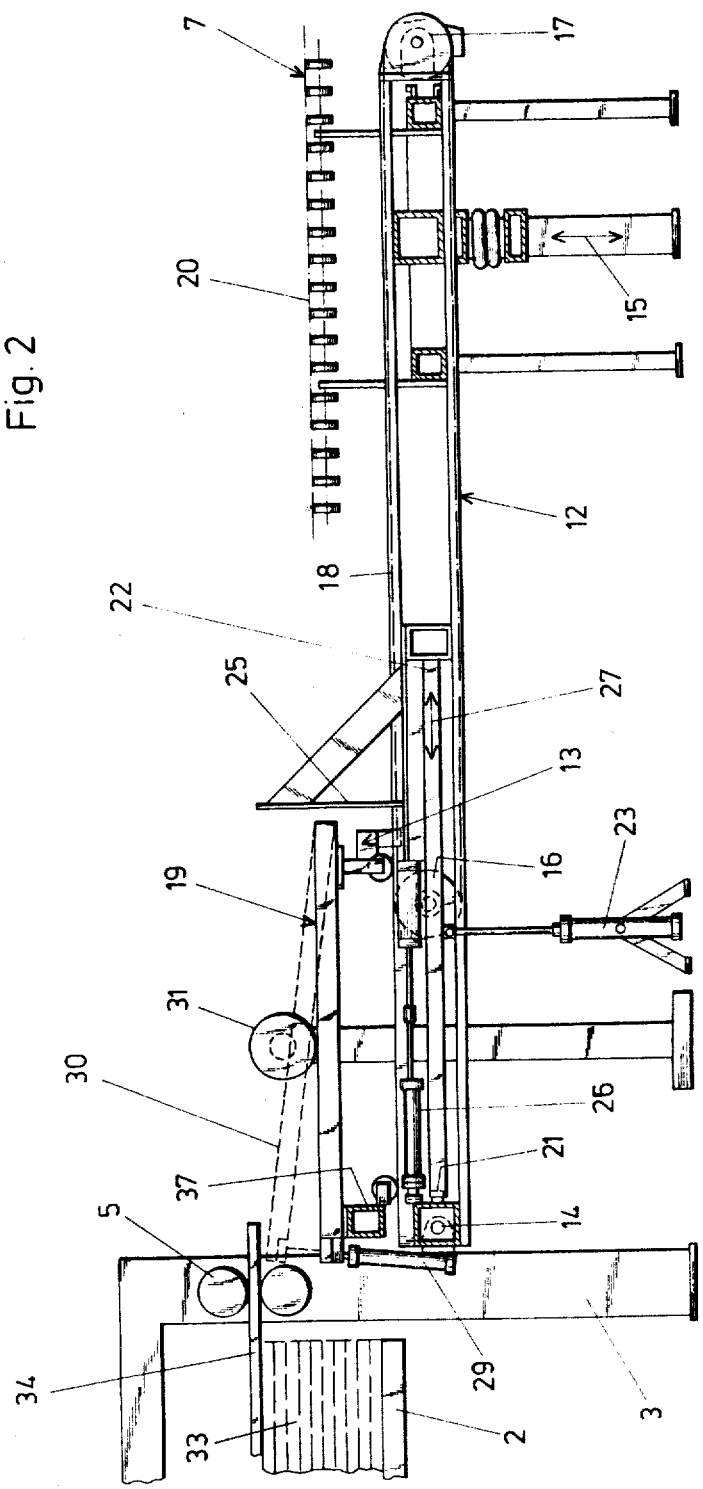
Figure 3:
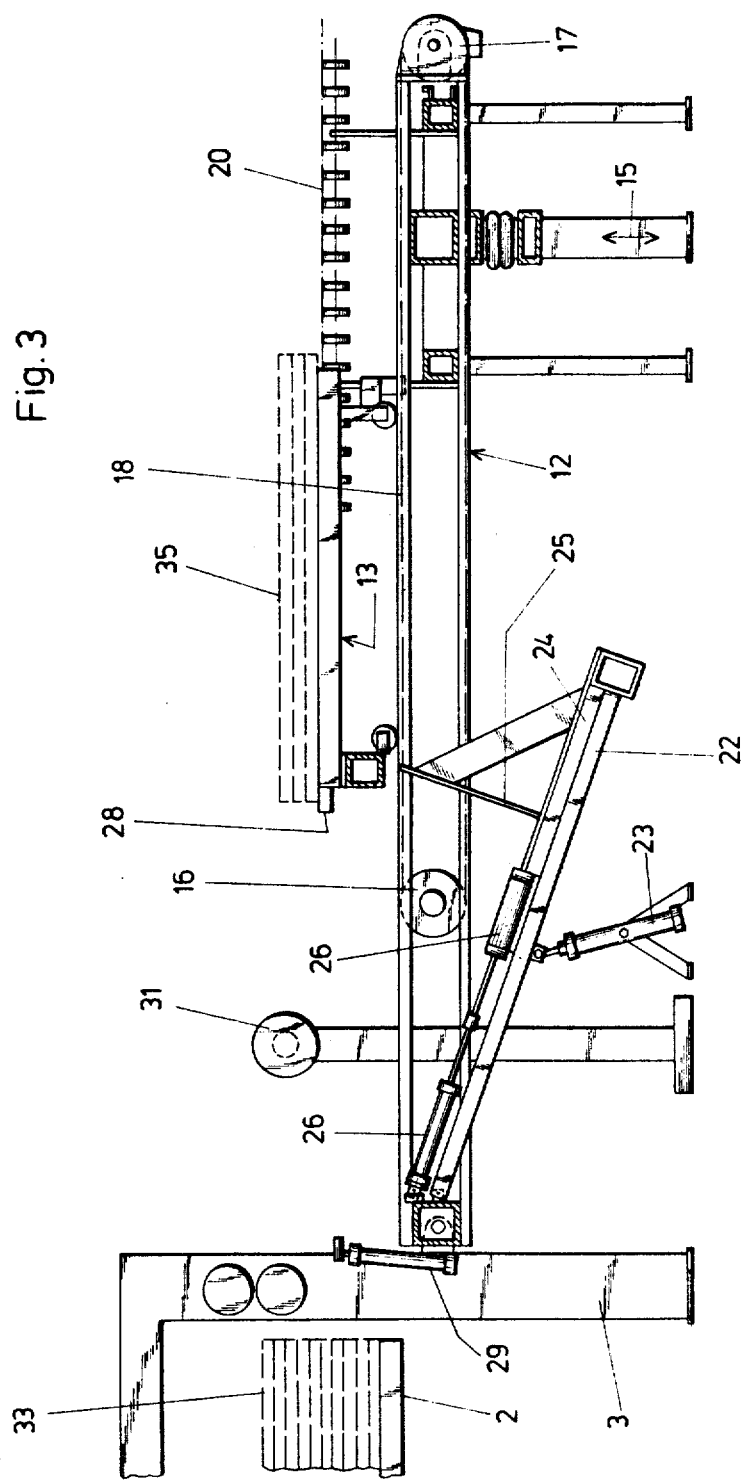

In order to describe the operation of the device of the invention, it will be assumed that on the support table 7 there is a stack of plates which is fed by means of the slide-in unit 10 of the sawing device 4 in a cyclical and programmed manner and that a stack of plates 33 has been transported onto the lifting table 2 within the portal frame 3 over the intake conveyor roller 1. Furthermore, it will be assumed that girders represented by the dashed lines 30 are raised to the position shown in FIG. 2 in such a manner that the ends of these girders having been pivoted upwardly will rest in a plane of the feed roller 5. The remaining parts of the device will be in a position as indicated in FIG. 2. By means of the slide-in device 6 (FIG. 1), a single plate 34 may be fed to the feed roller 5 whereupon the rollers rotating in opposite directions relative to each other will grip this plate and propel it forwardly to the right until the plate leaves the feed roller 5 and tilts downwardly onto the raised girders which are shown by the dashed lines 30. These girders, which have been driven upwardly, are then lowered down to the plane of the support surface 19. The girders operate to support the first planar workpiece of each stack of workpieces that is to be formed, since this workpiece would otherwise fall with great impact and noise onto the grated support surface 19 of the truck 13. Basically, it would also be possible to structure the grated support surface 19 in such a way that it could tilt upwardly as a whole.

If the first planar workpiece is deposited onto the truck 13 in this manner, then the stop and alignment blocks 25 and 31 are activated and they align the workpiece on the truck 13 against stops. Additional planar workpieces may now be conveyed through the feed roller 5 in continuous succession onto the truck 13, these workpieces then no longer requiring support during the in-feeding process since the air volume that must be displaced between two planar workpieces placed one above the other will cause a sufficient cushioning or damping effect for the falling workpiece.

When a sufficient number of planar workpieces have been deposited and aligned on the support surface 19 in this manner, the frame is lowered by means of the piston-cylinder unit 23 (FIG. 3) thereby clearing the path for the truck 13. Fundamentally, it is possible to activate the aligning process with the stop and aligning device 25 and 31 after each plate has been deposited or else to first stack the plates and then activate the parts 25 and 31 for the alignment process.

The driving motor 17 is then switched on pulling the truck 13 to the right by means of the drive chain 18 (FIG. 3) until the truck reaches its end position depicted in FIG. 4 where the motor 17 is then switched off by means of a cut-off device (not shown) which will be activated by the movement of the truck. The height of the truck 13 and the position of the tracks 12 will be related to each other in such a way that the support surface 19 of the truck 13 is situated somewhat above the support surface 20 of the support table 7 while the truck 13 is driven on the raised tracks. The tracks 12 may now be lowered (FIG. 4) by activation of the lifting mechanism 15 thereby causing the plate stack 35 to be transferred to the support table 7. The truck 13 will now have been unloaded and the motor 17 is once again activated in order to move the truck 13 into its original position shown in FIG. 1.

The lifting device 15 will again lift the tracks 12 while the stop and aligning devices 25 are raised by means of the lifting device 23. The slide-in device 6 begins once again to resume its operation and all of these procedures will be fully under electronic control and may be programmed so as to evolve within such a short period of time that during the return drive of the truck 13, the slide-in unit 10 and the sawing device 4 may resume their operation.

During separation of the plate stack which is now lying on the support table 7, a new plate stack is prepared on the truck 13. Since the clamps 36 on the slide-in unit which grip the plate package in a clamping manner when it is moved in against the sawing machine 4 may conveniently be constructed to be elevated, the truck 13 may transport a new plate stack toward the support table 7 when the slide-in unit 10 is situated in proximity to the sawing machine and the sawing machine is performing a last cut. As a result of this feature, the sawing machine may operate at a relatively high cycle rate since during the return drive of the slide-in unit into its position visible in FIG. 1, a new plate stack which has also been aligned will already be transferred to the support table 7.

In the embodiment depicted in the drawings, the tracks 12 are mounted to undergo pivotal movement. It is also possible within the scope of the invention to arrange the tracks 12 so that they may be raised and lowered in their entirety, thereby moving them parallel to themselves in a vertical plane. A further refinement of the construction of the tracks involves structuring the chassis of the truck 13 in such a way that the support surface 19 may be raised or lowered in its entirety in relation to the chassis of the truck 13 so that the truck can, when the position of the tracks 12 remains unchanged, perform the transfer function described previously.

It is also within the scope of the invention to construct the support surface 19 of the truck 13 so that it may be tilted upwardly as a whole. The stop or aligning device 25 in the embodiment depicted is pivoted downwardly. Here again, it is possible to move the stop or aligning device 25 sidewise or to raise it upwardly in order to enable the truck 13 to pass freely during its cycle of movements.

Furthermore, in the example shown, the arrangement is effected in such a way that the direction of motion of the truck 13 and the slide-in direction of the slide-in unit 10 are perpendicular to each other. It would basically be possible to also select an arrangement wherein the workpiece stacks may be moved in from the narrow side of the support table 7.

While a specific embodiment of the invention has been shown and described in detail to illustrate the application of the inventive principles, it will be understood that the invention may be embodied otherwise without departing from such principles.

What is claimed is:

1. Apparatus for feeding planar workpieces in a machine tool assembly, particularly upon a worktable for a cutting saw, comprising: support table means including a plurality of rollers arranged in adjacent rows and defining a support plane for said workpieces; feeding means for feeding said planar workpieces into said apparatus; reciprocating carriage means having a grated support surface operably interposed between said feeding means and said support table means for delivering said planar workpieces to said support table means when said carriage means is moved in a feeding direction; tracks extending between said feeding means and said support table means movably mounting said carriage means thereon, said carriage means being arranged on said tracks to have said grated support surface vertically adjustable in height between a raised position located above said support plane and a lowered position located below said support plane; and alignment stop means arranged to be moved between said carriage means and said support table means when said carriage means is moved against said feeding direction and to be pivoted out of the path of said carriage means when said carriage means is moved in said feeding direction; said grated support surface of said carriage means being composed of a plurality of girders extending in the feeding direction of said carriage means and spaced apart from each other wherein at least a portion of said plurality of girders are adapted to be raised at their ends closest to said feeding means; said upwardly movable ends of said girders being connected with each other by a transverse girder supported by a lifting device which is fixedly mounted sidewise of said carriage means.

2. Apparatus according to claim 1 wherein said tracks extend to beneath said support table means and wherein said tracks are supported by a lifting device at the area extending beneath said support table means, said tracks being pivotable about a horizontal axis at the opposite end thereof adjacent said feeding means.

3. Apparatus according to claim 2 wherein said alignment stop means is adjustably mounted in the longitudinal direction of said tracks to a frame arranged below the plane of the path of said carriage means by a piston-cylinder unit and wherein said frame is adapted to be lowered by pivoting about a pivot axis extending parallel to the pivot axis of said tracks.

4. Apparatus according to claim 1 further comprising guide discs and driving pinions mounted on said tracks over which there extend drive cable means connected with said carriage means.

5. Apparatus according to claim 1 wherein said plurality of girders are arranged to be moved to between said adjacent rows of rollers of said support table means in order to enable workpieces to be transferred from said carriage means to said support table means by lowering of said grated support surface of said carriage means.

* * * * *